US005542043A

United States Patent [19]

Cohen et al.

[11] Patent Number: 5,542,043

[45] Date of Patent: Jul. 30, 1996

[54] METHOD AND SYSTEM FOR AUTOMATICALLY GENERATING EFFICIENT TEST CASES FOR SYSTEMS HAVING INTERACTING ELEMENTS

[75] Inventors: David M. Cohen, Morristown; Siddhartha R. Dalal, Bridgewater; Michael L. Fredman, Edison; Gardner C. Patton, Bridgewater, all of N.J.

[73] Assignee: Bell Communications Research, Inc., Morristown, N.J.

[21] Appl. No.: 321,185

[22] Filed: Oct. 11, 1994

[51] Int. Cl.[6] .................................................. G06F 11/34

[52] U.S. Cl. .............. 395/183.08; 364/580; 364/267.91; 364/DIG. 1; 371/27

[58] Field of Search .................................. 395/575, 500, 395/700, 650, 183.01, 183.08, 183.09, 183.11, 183.14; 371/19, 16.1, 27, 29.1; 364/578, 580, 267.91, 550

[56] References Cited

U.S. PATENT DOCUMENTS

| | | | |
|---|---|---|---|
| 4,231,087 | 10/1980 | Hunsberger et al. | 371/16.1 |
| 4,696,003 | 9/1987 | Kerr et al. | 371/19 |
| 4,819,233 | 4/1989 | Debicia et al. | 371/19 |
| 5,159,600 | 10/1992 | Chintapalli et al. | 371/27 |
| 5,390,325 | 2/1995 | Miller | 395/575 |
| 5,394,347 | 2/1995 | Kita et al. | 364/578 |

OTHER PUBLICATIONS

Yip et al. "Graphical User Interfaces Validation: a Problem Analysis and a Strategy to Solution", IEEE 1991 pp. 91–100.

Tsai et al. "Automatic Test Case Generation from Relational Algebra Queris", IEEE 1988 pp. 252–258.

Brown et al. "A Cost Model for Determining the Optimal Number of Software Test Cases" IEEE 1989 pp. 218–221.

*Primary Examiner*—Robert W. Beausoliel, Jr.
*Assistant Examiner*—Albert Decady
*Attorney, Agent, or Firm*—Leonard C. Suchyta; Joseph Giordano

[57] ABSTRACT

Our method and system for enumerating a minimal number of test cases for systems with interacting elements operates relationships between the elements and the number of characteristics evaluated for each element. In our inventive method as executed in a computer system, the user enters values for each of the elements and then defines relationships between the elements. Our method then enumerates a table of test cases for each relationship between elements using deterministic procedures, when applicable, and random procedures when the deterministic procedures are not applicable. After a table of test cases is generated for each of the relation, our inventive method combines relationships into a single table of test cases.

23 Claims, 8 Drawing Sheets

```
_DCOA MAIN LOGOFF          SWITCH              mm:dd:yy hh:mm
              RPT RNGE (REPORT RANGE) DATA REQUEST
loc/wc: ____    desi: ____                                  ⌐29
HEADING: ____         MODE: ___  PRI: _  emp: ___    UPTA = PAIR □TRIPS □WHERE
                    30┘        31┘     32┘

INPUT RANGE OPTION

    RANGE TYPE: ____

FILTER OPTIONS

    IC: ___      ICID: ___      RUID: ___      CILL: ___
    NPANXX: _____
    CABLE: _____
    TID GRP: _____

    EXEC RPT                                            (C:1)
CMD LIND: RPT ____
RNGE _____
```

| $f_1$ | $f_2$ | $f_3$ | $f_4$ |
|---|---|---|---|
| $v_1$ | $v_1'$ | $v_1''$ | $v_1'''$ |
| $v_2$ | $v_2'$ | $v_2''$ | $v_2'''$ |
| $v_3$ | $v_3'$ | $v_3''$ | $v_3'''$ |

34

35 37 38 39

| $(\alpha_1, \alpha_2)$ | $a_1, \lambda=0$ | $a_2, \lambda=1$ | $a_3, \lambda=2$ | $a_4$ |
|---|---|---|---|---|
| 36 (0, 0) | 0 | 0 | 0 | 0 |
| (1, 0) | 1 | 1 | 1 | 0 |
| (2, 0) | 2 | 2 | 2 | 0 |
| 40 (0, 1) | 0 | 1 | 2 | 1 |
| (1, 1) | 1 | 2 | 0 | 1 |
| (2, 1) | 2 | 0 | 1 | 1 |
| (0, 2) | 0 | 2 | 1 | 2 |
| (1, 2) | 1 | 0 | 2 | 2 |
| (2, 2) | 2 | 1 | 0 | 2 |

| $f_1$ | $f_2$ | $f_3$ | $f_4$ | $f_5$ | $f_6$ | $f_7$ | $f_8$ | $f_9$ |
|---|---|---|---|---|---|---|---|---|
| 0 OR 1 | 0 OR 1 | 0 OR 1 | 0 OR 1 | 0 OR 1 | 0 OR 1 | 0 OR 1 | 0 OR 1 | 0 OR 1 |

44

| $f_1$ | $f_2$ | $f_3$ |
|---|---|---|
| 0 OR 1 | 0 OR 1 | 0 OR 1 |

45

| | | |
|---|---|---|
| 0 | 0 | 0 |
| 0 | 1 | 1 |
| 1 | 0 | 1 |
| 1 | 1 | 0 |

46

| | | | | | | | | | |
|---|---|---|---|---|---|---|---|---|---|
| 41 | 0 | 0 | 0 | 0 | 0 | 0 | 0 | 0 | 0 |
| | 0 | 0 | 0 | 1 | 1 | 1 | 1 | 1 | 1 |
| | 1 | 1 | 1 | 0 | 0 | 0 | 1 | 1 | 1 |
| | 1 | 1 | 1 | 1 | 1 | 1 | 0 | 0 | 0 |
| 42 | 0 | 0 | 0 | 0 | 0 | 0 | 0 | 0 | 0 |
| | 0 | 1 | 1 | 0 | 1 | 1 | 0 | 1 | 1 |
| | 1 | 0 | 1 | 1 | 0 | 1 | 1 | 0 | 1 |
| | 1 | 1 | 0 | 1 | 1 | 0 | 1 | 1 | 0 |

| | | | |
|---|---|---|---|
| 0 | 0 | 0 | 0 |
| 1 | 1 | 1 | 0 |
| 2 | 2 | 2 | 0 |
| 0 | 1 | 2 | 1 |
| 1 | 2 | 0 | 1 |
| 2 | 0 | 1 | 1 |
| 0 | 2 | 1 | 2 |
| 1 | 0 | 2 | 2 |
| 2 | 1 | 0 | 2 |

56

55

56

51

| | | | | | | | | | | | | |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 1 | 1 | 1 | 1 | 1 | 1 | 1 | 0 | 0 | 0 | 0 |
| 2 | 2 | 2 | 2 | 2 | 2 | 2 | 2 | 2 | 0 | 0 | 0 | 0 |
| 0 | 0 | 0 | 1 | 1 | 1 | 2 | 2 | 2 | 1 | 1 | 1 | 0 |
| 1 | 1 | 1 | 2 | 2 | 2 | 0 | 0 | 0 | 1 | 1 | 1 | 0 |
| 2 | 2 | 2 | 0 | 0 | 0 | 1 | 1 | 1 | 1 | 1 | 1 | 0 |
| 0 | 0 | 0 | 2 | 2 | 2 | 1 | 1 | 1 | 2 | 2 | 2 | 0 |
| 1 | 1 | 1 | 0 | 0 | 0 | 2 | 2 | 2 | 2 | 2 | 2 | 0 |
| 2 | 2 | 2 | 1 | 1 | 1 | 0 | 0 | 0 | 2 | 2 | 2 | 0 |
| 0 | 1 | 2 | 0 | 1 | 2 | 0 | 1 | 2 | 0 | 1 | 2 | 1 |
| 1 | 2 | 0 | 1 | 2 | 0 | 1 | 2 | 0 | 1 | 2 | 0 | 1 |
| 2 | 0 | 1 | 2 | 0 | 1 | 2 | 0 | 1 | 2 | 0 | 1 | 1 |
| 0 | 2 | 1 | 0 | 2 | 1 | 0 | 2 | 1 | 0 | 2 | 1 | 2 |
| 1 | 0 | 2 | 1 | 0 | 2 | 1 | 0 | 2 | 1 | 0 | 2 | 2 |
| 2 | 1 | 0 | 2 | 1 | 0 | 2 | 1 | 0 | 2 | 1 | 0 | 2 |

PAIR WISE TEST CASES FOR RELATION 1

| DEST | MODE | PRI |
|---|---|---|
| COLOR | 600dpi | D |
| BLANK | BLANK | D |
| COLOR | BLANK | D+ |
| BLANK | 600 dpi | D+ |
| COLOR | 600 dpi | D- |
| BLANK | BLANK | D- |

61

PAIR WISE TEST CASES FOR RELATION 2

| DEST | MODE | PRI |
|---|---|---|
| MYPRINTER | BLANK | I |
| BLANK | BLANK | I |

62

NON-INTERACTING FIELDS (RELATION 3)

| WC | HEAD |
|---|---|
| WC38 | TOTAL1 |
| WC38 | TOTAL2 |

| DEST | MODE | PRI |
|---|---|---|
| COLOR | 600dpi | D |
| BLANK | BLANK | D |
| COLOR | BLANK | D+ |
| BLANK | 600 dpi | D+ |
| COLOR | 600dpi | D- |
| BLANK | BLANK | D- |
| MYPRINTER | BLANK | I |
| BLANK | BLANK | I |

72

| WC | HEAD | DEST | MODE | PRI |
|---|---|---|---|---|
| WC38 | TOTAL1 | COLOR | 600dpi | D |
| WC38 | TOTAL2 | BLANK | BLANK | D |
| WC38 | TOTAL1 | COLOR | BLANK | D+ |
| WC38 | TOTAL2 | BLANK | 600 dpi | D+ |
| WC38 | TOTAL1 | COLOR | 600dpi | D- |
| WC38 | TOTAL2 | BLANK | BLANK | D- |
| WC38 | TOTAL1 | MYPRINTER | BLANK | I |
| WC38 | TOTAL2 | BLANK | BLANK | I |

| $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | $f_{14}$ | $f_{15}$ |
|---|---|---|---|---|---|---|---|---|---|---|---|---|---|---|
| 3 | 3 | 3 | 3 | 3 | 2 | 2 | 2 | 2 | 2 | 3 | 3 | 3 | 3 | 3 |

82 83 82

85

| | | | | | | | | | | | | | | |
|---|---|---|---|---|---|---|---|---|---|---|---|---|---|---|
| 0 | 0 | 0 | 0 | 0 | 0 | 0 | 0 | | | 0 | 0 | 0 | 0 | 0 |
| 1 | 1 | 1 | 1 | 1 | 0 | 0 | 0 | | | 0 | 1 | 1 | 1 | 1 |
| 2 | 2 | 2 | 2 | 2 | 0 | 0 | 0 | | | 2 | 2 | 2 | 2 | 0 |
| 0 | 0 | 0 | 1 | 1 | 1 | 1 | 0 | | | 1 | 2 | 2 | 2 | 1 |
| 1 | 1 | 1 | 2 | 2 | 1 | 1 | 0 | | | 2 | 0 | 0 | 0 | 1 |
| 2 | 2 | 2 | 0 | 0 | 1 | 1 | 0 | | | 0 | 1 | 1 | 1 | 1 |
| 0 | 0 | 0 | 2 | 2 | 0 | 0 | 0 | | | 2 | 1 | 1 | 1 | 2 |
| 1 | 1 | 1 | 0 | 0 | 0 | 0 | 0 | | | 0 | 2 | 2 | 2 | 2 |
| 2 | 2 | 2 | 1 | 1 | 0 | 0 | 0 | | | 1 | 0 | 0 | 0 | 2 |
| 0 | 1 | 2 | 0 | 1 | 1 | 0 | 1 | | | 2 | 0 | 1 | 2 | 0 |
| 1 | 2 | 0 | 1 | 2 | 0 | 0 | 1 | | | 0 | 1 | 2 | 0 | 1 |
| 2 | 0 | 1 | 2 | 0 | 0 | 1 | 1 | | | 1 | 2 | 0 | 1 | 2 |
| 0 | 2 | 1 | 0 | 2 | 0 | 1 | 0 | | | 1 | 0 | 2 | 1 | 0 |
| 1 | 0 | 2 | 1 | 0 | 0 | 0 | 0 | | | 2 | 1 | 0 | 2 | 1 |
| 2 | 1 | 0 | 2 | 1 | 1 | 0 | 0 | | | 0 | 2 | 1 | 0 | 2 |

86 87

METHOD AND SYSTEM FOR AUTOMATICALLY GENERATING EFFICIENT TEST CASES FOR SYSTEMS HAVING INTERACTING ELEMENTS

TECHNICAL FIELD OF THE INVENTION

This invention relates to the testing of computer software. More specifically, the present invention relates to systems and processes for the efficient generation and enumeration of a minimal number of test cases necessary to robustly test a software system.

BACKGROUND OF THE INVENTION

Transactional computer systems are becoming larger and more complex. Telephone companies have implemented transaction processing to improve efficiencies in their operational support systems. Typically, users interact with these transaction processing systems by entering data in fields on a CRT screen and then expecting a response in other fields on the screen. As new software is developed, these software systems have to be tested before they are delivered to end users.

Software testers test by developing test cases that specify combinations of screen inputs which are entered into the system to see if the response of the system is appropriate as a result of the inputs. One method of testing would be to create test cases for all combinations of all input values on the screen. For most systems, because of the large number of screens with multiple fields each with multiple values, the number of test cases that can be generated is extremely large. Accordingly, the cost of conducting such tests could be exorbitant. Therefore, in the current art the number of test cases is reduced by taking sample values for each field; such as the minimum value, a maximum value, and some intermediate value for a numeric field. Even so, the cost of conducting screen testing in the current art can increase the cost of software development by up to 30%. These problems are not unique to screen based software systems. In the area of protocol conformance testing, protocols and features have typically been modeled as finite state machines. However, the number of test cases to test a finite state machine with n states is a polynomial in n. Since protocols typically have thousands of states, and may have millions, traditional finite state machine based testing produces an unreasonable number of tests. The example that follows highlights some of the problems.

Assume a system with one screen and n fields on this screen. Suppose also that after an analysis of the system requirements used to create the software, only a limited number of inputs (i) is considered for testing. Then the number of possible test cases, each containing values for all fields on the screen is $i^n$. This can be quite large even for a single screen. As an example, suppose only three values (i=3) are to be considered for each field and there are 13 fields (n=13) on the screen then the number of exhaustive test cases are $3^{13}$=1,594,323. Obviously, this number is very large and exhaustive testing is far beyond anyone's available resources. Thus, typical testers find various ways of cutting down the number of combinations, e.g. by gut feel, or by just trying out all the values one field at a time, holding all other fields at default values. Unfortunately, this method of default testing will not take into account interactions, or dependencies between various fields.

Some researchers in the field have examined the application of experimental design techniques used for planning experiments to the area of software testing (Phadke, M. S., "Quality Engineering Using Robust Design", Prentice Hall, Englewood Cliffs, N.J., 1989). Specifically, Pahdke proposes the use of orthogonal array designs for testing software. Orthogonal array designs are test sets such that for any pair of fields all combinations of input levels occur exactly an equal number of times. As an example, consider the situation where one screen has three fields (n=3) with two possible inputs per field (i=2). An exhaustive test of all possible combinations would result in 8 test sets as shown in Table 1 below.

TABLE 1

Exhaustive Test Array

| | FIELDS | | |
|---|---|---|---|
| TEST NO. | $F_1$ | $F_2$ | $F_3$ |
| 1 | 1 | 1 | 1 |
| 2 | 1 | 1 | 2 |
| 3 | 1 | 2 | 1 |
| 4 | 2 | 1 | 1 |
| 5 | 1 | 2 | 2 |
| 6 | 2 | 1 | 2 |
| 7 | 2 | 2 | 1 |
| 8 | 2 | 2 | 2 |

Using experimental design techniques, a corresponding orthogonal array of the same fields and values results in 4 test cases as shown in Table 2 below.

TABLE 2

Orthogonal Test Array

| | FIELDS | | |
|---|---|---|---|
| TEST NO. | $F_1$ | $F_2$ | $F_3$ |
| 1 | 1 | 1 | 1 |
| 2 | 1 | 2 | 2 |
| 3 | 2 | 1 | 2 |
| 4 | 2 | 2 | 1 |

Table 2 depicts every pair of inputs exactly once and has only four test cases. This is a 50% reduction in test cases from the fully enumerated set of test cases shown in Table 1.

While orthogonal arrays provide test sets that cover every pair of inputs with many fewer test cases than the exhaustive test set, this prior art solution has a number of problems. First and foremost, not every combination of fields and inputs has a corresponding orthogonal array. For example, when there are 7 fields and each field has 6 possible inputs, an orthogonal array does not exist. Another problem with the orthogonal array is that they are difficult to construct; there is no single unified way of generating an orthogonal array. This difficulty is exacerbated when there are an unequal number of values for each of the fields. Orthogonal arrays are also wasteful in that they require each pair of inputs to occur exactly the same number of times. This property of balance is often necessary in statistical experiments where equal precision is required. However, in software testing it is unnecessary to require an equal number of replicates.

Therefore, an object of our invention is an automated method and system that overcome the limitations in the prior art and incorporate interactions between fields while reducing the number of test cases necessary to robustly test software systems.

SUMMARY OF THE INVENTION

Our invention is a method and system for enumerating a minimal number of test cases for systems having interacting elements. As described herein for screen based software systems, our invention operates on a construct of fields, the number of field values, and relationships between fields. In our method, as executed in a computer system, the user enters values for each of the fields, defines relationships between the fields, and then defines the degree of interaction between fields. Our method then enumerates a table of test cases for each relationship between fields using deterministic procedures, when applicable, and random procedures when the deterministic procedures are not applicable. After a table of test cases is generated for each relationship, our inventive method combines the test cases for different relationships into a single table of test cases. In other applications where a system is comprised of component elements with different characteristics, our invention treats component elements as analogous to fields and component characteristics as analogous to field values.

BRIEF DESCRIPTION OF THE DRAWINGS

FIG. 3 depicts as an example of a relation and a table of test cases generated using our projective plane algorithm.

FIG. 4 depicts a table of test cases created using our product rule procedures.

FIG. 5 depicts two tables created in accordance with our reduced product rule procedures.

FIG. 6 depicts tables of test cases for three types of relations.

FIG. 7 depicts a consolidated table of test cases created using our test case merging process.

FIG. 8 depicts example test case tables generated in accordance with our invention.

DETAILED DESCRIPTION

Our invention is a method and system for enumerating a minimal number of test cases that incorporates the interactions between fields and which overcomes the limitations of the prior art.

Figure 1:
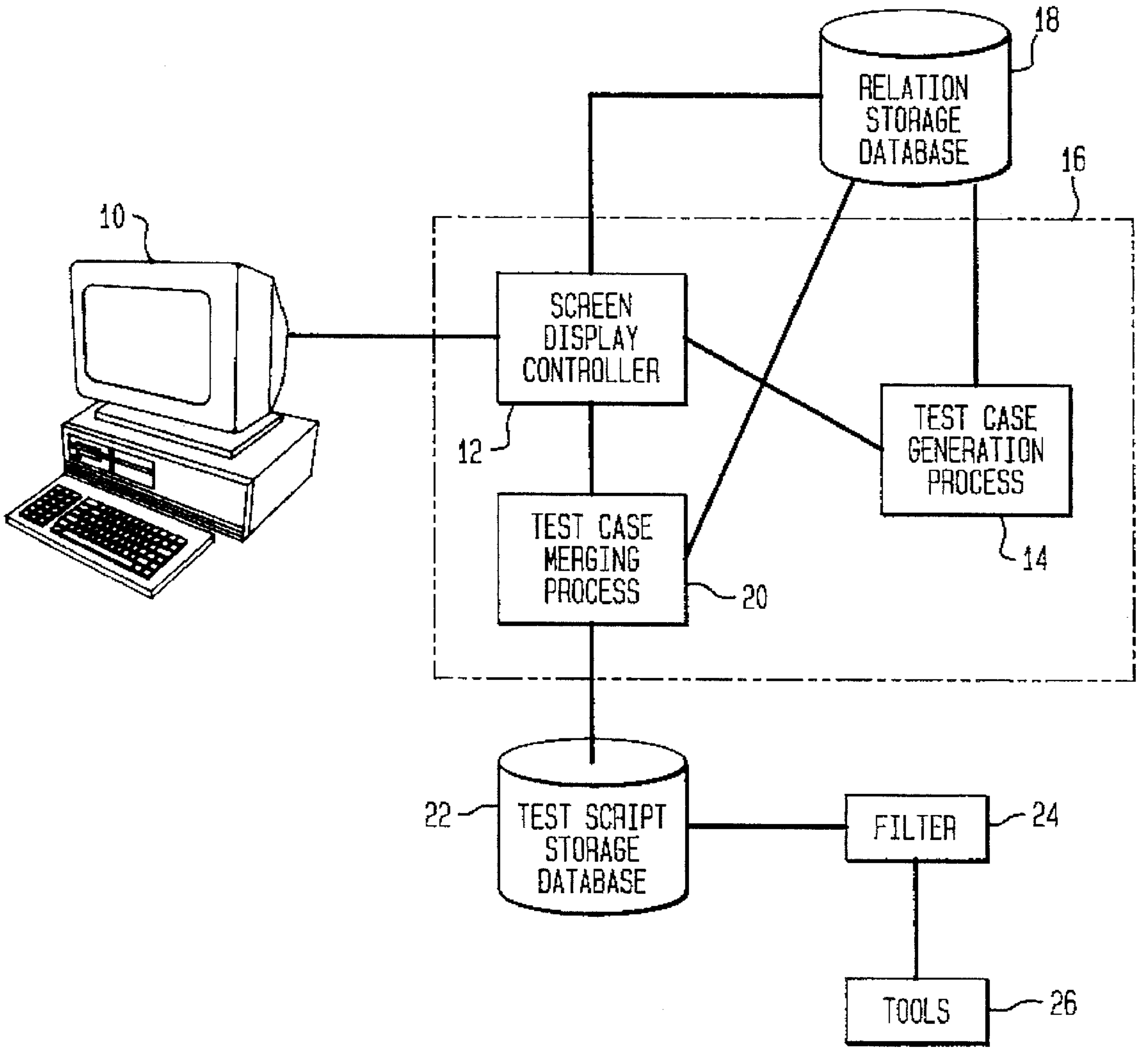
FIG. 1 illustrates our inventive system.
Figure 2:
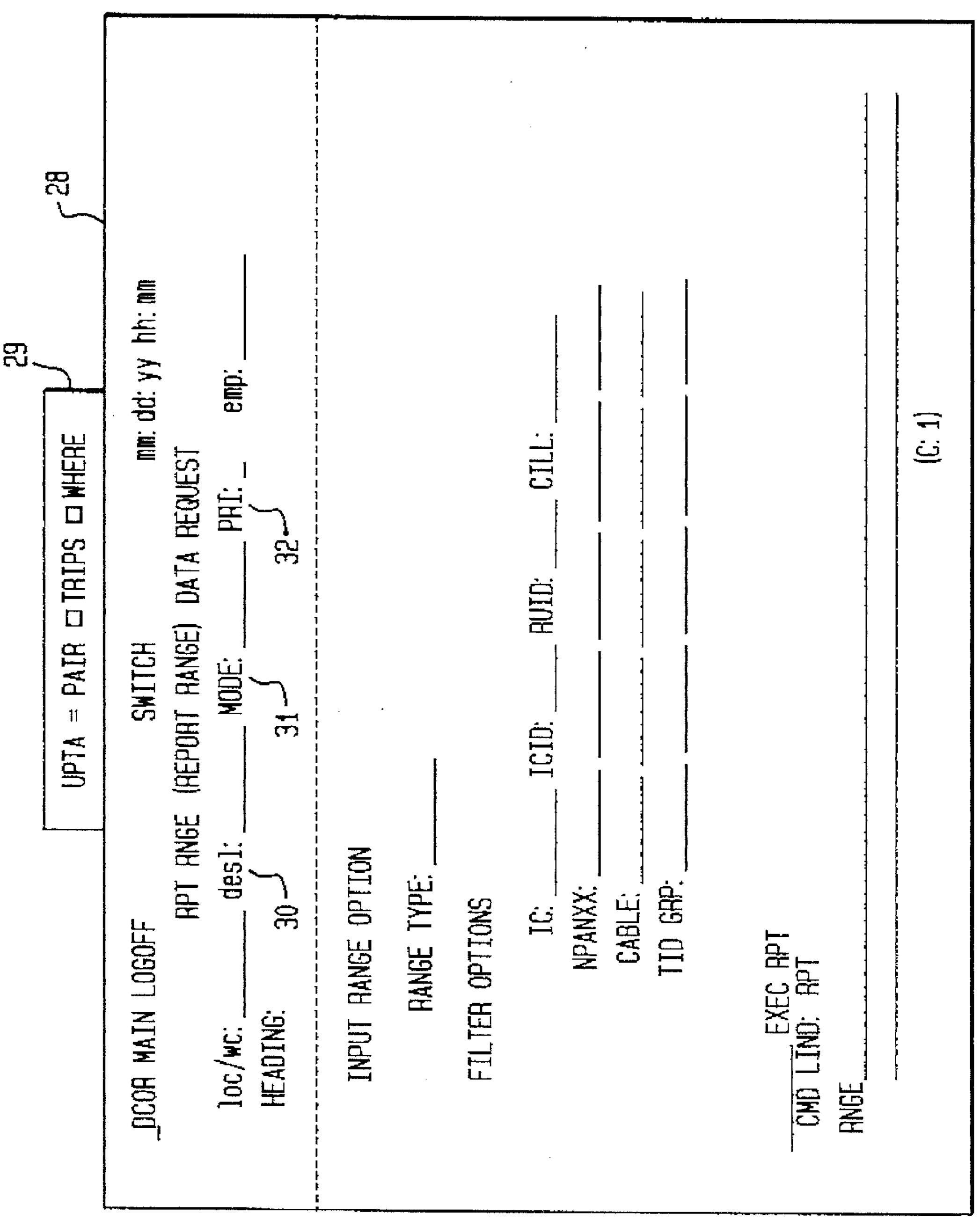
FIG. 2 depicts a sample input screen of an embodiment of our sample system.

An illustrative embodiment of our invention is shown in FIG. 1 which includes a screen display device 10 on which the screen shown in FIG. 2 would be displayed. Users would enter values for fields on the screen 28 (or over a plurality of screens) and define the relationships between these fields (hereinafter called a relation) which establish validation rules for groups of the fields. The user would also enter constraints and a parameter specifying the degree of field interaction 29 for each relation. Users may also specify the system's correct response to the input combinations generated from a relation. For example, the proper system response to an input may simply be a message that the inputs are legal or the proper response may be an action such as setting up a telephone call. The display controller process 12 would store these field relations and validation rules in the relation database 18. Tables of test cases for each relation are created in process 14 and then stored also in database 18. After all the data is entered, the field relationships defined, and individual tables of test cases generated, the user would request the generation of a consolidated table of test cases.

The test script merger process 20 would then generate a single table of test cases combining the tables of test cases generated by process 16. The resulting table of test cases would be stored in database 22. The table of test cases could then be used as input to a filter process 24 (many are known in the art) to translate the table of test cases into a form readable by test script generation process 26 (also known in the art) to generate executable test scripts for a software system.

The system described above implements our inventive methods for enumerating a minimal number of test cases. Our inventive methods are comprised of two general sets of procedures; one for generating a table of test cases for each individual relation as embodied in process 14 and another for combining the individual tables into a single table as embodied in process 20. The building blocks used in each set of procedures are the fields, field values, relations, and degree of field interactions entered by the user of our inventive system. Our system and method can also be used to generate test cases for testing protocol conformance and feature interactions of software. In screen based database applications, fields correspond to the fields on the screen. In protocol conformance applications fields correspond to the decision points that determine a test scenario, such as choice of parameters and orderings of events.

To create a relation, the user specifies the fields in the relation, a set of valid and invalid values for each field and constraints. The fields specified could all come from one screen or span a plurality of screens. Within screen 28 are examples of three fields (DEST 30, MODE 31, and PRI 32). Table 3 below depicts a relation of valid values for those fields (color or blank for DEST, 600 dpi or blank for MODE, and D, D+, or D− for PRI) related to the printing the output of a database query. These field values together define a relation. DEST represents destination printer, MODE represents mode, and PRI represents

TABLE 3

| Valid Values for relation 1 | | |
|---|---|---|
| DEST | MODE | PRI |
| color | 600 dpi | D |
| blank | blank | D+ |
| | | D− |

TABLE 4

| Valid Values for relation 2 | | |
|---|---|---|
| DEST | MODE | PRI |
| myprinter | blank | I |
| blank | | |

the priority. In essence relation 1 says that when the priority is one of the deferred values (D,D−,D+), the valid values for DEST are color or blank and the valid values for MODE are 600 dpi or blank. Table 4 depicts another relation for the fields DEST, MODE, and PRI. Table 4 indicates that when the valid field for PRI is I (immediate) the valid values for field DEST is my printer or blank, and the valid value for MODE is blank. These two relations together check that the software that interfaces between a user and a printer enforces the requirements that the local printer can be used only when the priority is immediate; and the color printer and 600 dpi mode can only be used when the priority is deferred.

Once the user specifies the relationships among fields and values, the user also specifies the degree of interaction between fields that the user wishes to test; the interactions can be specified as any n-combination (e.g. pair-wise, triples, exhaustive, etc.). As an example, pair wise combinations mean that for any two fields $f_1$ and $f_2$ and any valid values, $v_1$ for $f_1$ and $v_2$ for $f_2$, there is some test case in which $f_1$ has the value $v_1$ and $f_2$ has the value $v_2$. Using relation 1 as an example, testing the pair-wise combinations of the valid values results in the test cases shown 61 in FIG. 6. Exhaustive testing would have required twelve test cases. For relation 2 there are two test cases 62 shown in FIG. 6 for exhaustive or pairwise testing, alike. Thus, exhaustive testing for both relations would have required 14 test cases, while pair-wise testing requires a total of 8 test cases.

The six test cases 61 depicted in FIG. 6 for relation 1 were generated using our procedures for generating a table of test cases as implemented in test case generation process 14. This process uses a new set of deterministic procedures based on known deterministic algorithms in combination with a random procedure based on a random algorithm developed. In our embodiment of process 14, deterministic procedures are used first to attempt to produce a table. If deterministic procedures cannot directly be used because the number of fields and interactions are not conducive to a deterministic approach, then the relation is decomposed into sub-parts for which test cases can be generated using deterministic procedures. Process 14 uses the generated test cases for the sub-parts as seed test cases for our random procedure which then completes the generation of a table of test cases for that relation.

Deterministic Procedures

The first step in our deterministic process is to examine a relation and determine the group of fields with the largest number of field values or the largest group of fields with the same number of field values. The next step is then to examine this group of fields to see if a table of test cases can be generated using a deterministic algorithm; in our embodiment, the deterministic algorithms are either our projective plane procedures, our application of the general product rule procedures, or just an exhaustive enumeration of all combinations of field values. If there is only one field with the largest number of field values, our deterministic procedures simply generate all n-way combinations (where n is the degree of interaction) for selected subset of fields with the highest number of field values using the well known in the art techniques of exhaustive enumeration. These test cases are then compared with test cases generated from our projective plane or product rules procedures from a subset of the relation with the largest number of fields having common values. This subset of fields is used to seed the random algorithm which is used for completing the table by filling in values for the remaining fields.

Our generalized projective plane procedures are used when the number of values is a fixed prime power q and the number of fields is q+1. The classical projective plane construction as taught in the art is based on the geometry of the projective plane (see Hall Jr., M., Combinatorial Theory, Wiley Interscience, New York, 1986). It has been used for experimental design for pair-wise interactions. The generalized projective plane construction gives a table of $q^n$ test cases where q is the number of field values and n is the degree of interaction and $n \leq q+1$. Our generalized projective plane procedures develop n-way coverage as follows.

The number of test cases necessary to cover n-way interactions of q number of field values is $q^n$. Our procedure then lists the number of n-way combinations as $(\alpha_1, \ldots, \alpha_n)$ with $(\mathbf{0}, \ldots, \mathbf{0})$ being the first and $(n-1, \ldots, n-1)$ being the last. Our process then determines test cases of the form $(a_1, \ldots a_f)$, with f being the number of fields. For $\lambda$ from 0 to q, the value $$\sum_{i=1}^{n} \alpha_i \times \lambda^{i-1}$$

(mod q) is the value at field $\lambda$ for test case labeled $(\alpha_1, \ldots, \alpha_n)$. If f=q+1, then the value for $a_f$ is $\alpha_n$. The field q+1 is called the "line at infinity". For the situation when q is a prime power but not a prime number, an identification needs to be made between numbers 1 to q and the finite field with q elements.

As an example of applying our procedures to a relation, assume the relation 30 as shown in FIG. 3 with four fields each with three values. Further assume that the user wishes to generate test cases for pair-wise combinations of the fields. Our process numbers the test cases according to the number of pair wise combinations that can be generated as depicted in column 35. With three levels of values for each field, the number of pair wise combinations (n=2) that can be generated is nine ($3^2$). Therefore, to generate the first of nine test cases of the form $(a_1,a_2,a_3,a_4)$ for pair-wise interactions, we use the formula $$\sum_{i=1}^{n} \alpha_i \times \lambda^{i-1}$$

(mod 3), where $\alpha_1$ is the first value of the first pair 36 and $\lambda$ the number representing the field position 37 from the vector $(\mathbf{1}, \ldots, \mathbf{q})$ representing the number of fields. Therefore, the value for $a_1$ is $\alpha_1$ times $\lambda^{1-1}$ plus $\alpha_2$ times $\lambda^{2-1}$ at field 1 ($\lambda$=0), which equals 0 shown at 38. The value for $a_2$ is $\alpha_1$ times $\lambda^{1-1}$ plus $\alpha_2$ times $\lambda^{2-1}$ at field 2 ($\lambda$=1) which is also 0 shown at 39. This process is repeated for each $a_i$ for each of the nine test cases. The resultant table is a table of nine test cases 34 as shown in FIG. 3. At first glance, it may not be apparent how the table 34 relates to the relation 30. In the table 34 each of the columns 33 represent the fields, and each number in the each cell within each column represents a field value. For example, looking at the fourth test case, labeled (0,1) 40, the 0 under the column $a_1$ indicates the first field value for field 1 and the 2 under column $a_3$ indicates the third value for field 3. Accordingly, the fourth test case shown in the table 34 for relation 30 is $(v_1, v_2', v_3'', v_2''')$.

The projective plane algorithm is only directly applicable when the number of fields values is q (a prime or power of prime) and the number of fields is less than or equal to q+1. (It is also effective when the number of values is close to a prime power, for example 10 is close to 11). Often a relation does not easily fit the projective plane construct. Under those circumstances, our test case enumeration process breaks the relation into sub-relations to determine if test cases for a sub-relation can be generated deterministically, either using the projective plane procedures or, if it is small enough, through exhaustive enumeration. If so, the subrelations are then combined using product rules. The product rules are only directly applicable whenever each field has the same number of field values and the degree of field interaction is pair-wise.

As an example, consider a relation 43 shown in FIG. 4 having 9 fields each with two field values. Our process would take a subset of the relation 44, for which our projective plane algorithm can be applied, and generate test cases for that subset. In this example, four test cases 45 were generated for relation 44 for pair wise coverage of three fields each with two field values. Our product rules produce a table of 8 test cases for nine fields 46. These test cases 46 are the product of the four test cases 45 combined with itself. The process for doing so is to repeat each of the elements in the first table by the number of fields in the second table and then repeat each of the sequence of elements for the fields in the second table by the number of fields in the first table. Our process then examines the resulting table of test cases looking for duplicates and removes any redundant cases. In our example above, the fifth test case 42 is a duplicate of the first test case 41 and therefore would be removed.

Our implementation of the product rules can be generalizes as follows. Let S and T be two sets of test cases with the same number of values for each field. The number of fields may vary; as an example let S have m fields and T have r fields. A typical test case in S would be written as $(s_1, \ldots, s_m)$. A typical test case for T would be written as $(t_1, \ldots, t_r)$. The product of the test cases for m*r fields would be of the form $(s_1, \ldots s_1, s_2, \ldots, s_2, \ldots s_m, \ldots s_m)$ repeated r times for each $s_i$ and $(t_1, \ldots, t_r, \ldots, t_1, \ldots, t_r)$ where each test case $(t_1, \ldots, t_r)$ is repeated m times.

An alternative approach called the reduced product rule is applicable to the situation where there exists a test set T generated by the projective plane approach and a test set S having the same number of field values as T but an arbitrary number of fields. The reduced product rule approach reduces T by removing the values for the last field from the table of test cases and also removing the test cases in which all of the entries are the same. We then use our product rules to combine T' and S. To the result we add a column with the value 0 for the test cases from S and the value of the elements removed from T when the column was deleted for each of the test cases T'.

As an example, let T be the table 50 as depicted in FIG. 5 which is a table of test cases generated by our projective plane algorithm for a relation having four fields and three field values. If our objective is to produce a table of test cases for 16 fields, each with three field values and pair wise interactions, our process would use the product rules to create a table which would have 17 test cases for 16 fields. Using our reduced product rule procedures would produce table 51 shown in FIG. 5 having fifteen test cases 53 for thirteen fields 54. Such a table of test cases is created by modifying table 50 by removing the last column 55 and also removing the first three rows 56 because each of the values remaining are the same. The modified table 50 is then combined with the original table 50 using our product rules to produce the table of fifteen test cases 51.

RANDOM PROCESS

Our random procedure is used to complete the generation of a table of test cases when the deterministic procedures cannot be used to generate a complete table of test cases for a relation. For each new test case, our random procedure begins by generating a set of candidate test cases using our locally greedy algorithm described below. Given this set of candidate test cases, the algorithm picks the next test case using an evaluation function which assigns a score to each candidate test case. The test case added to the table is the candidate test case with the highest score. The two basic evaluation functions are the "edge-greedy" evaluation function and the "balanced greedy" evaluation function.

The basic steps that comprise our locally greedy random method are as follows:

1. Select at random a (n−1) set (n=the degree of interaction) that has the highest priority. For example, in the case of pairwise coverage, this would be a (field, value) that belongs to the greatest number of uncovered pairs.
2. Select at random an order for the remaining fields. Working in that order, for each new field, find the field values that give the highest score with respect to the evaluation function selected by the user for the run. Choose one of them at random and proceed to the next field.

For example, using relation 1, if the values color and 600 dpi have been found for fields DEST and MODE, respectfully, then for each value for field PRI, one of the evaluation functions is used to find the score for a test set including DEST with value color, MODE with value 600 dpi, and PRI with value D.

3. After a value has been chosen for each factor, check that the generated test case meets all of the constraints. If the resulting test case violates a constraint, then permute the field labels as they are associated with the specified values and see of the resultant test case violates the constraint. If this does not work not, discard the test case and generate another. If none of the generated test cases satisfies the constraints, the algorithm uses an exhaustive search to find a test case. If a constraint does not rule out a large percentage of the test cases, one of the generated candidate test cases is likely to satisfy it. The other constraints can be satisfied by having the evaluation function assign low scores to partial test cases that violate them.

Evaluating the sample test cases according to our edge-greedy algorithm completes a local optimization of the number of new n-sets covered by each test case. Namely, the score assigned to a partial test case is the number of n-sets contained in the partial test cases that have not yet been covered previously. For example, for pair wise coverage, the score for a test case {(DEST, color),(MODE, 600 dpi), (PRI,D)} will be 2 if the previously selected test cases did not cover the two pairs {(DEST, color), (MODE, 600 dpi)(PRI,D)}, {(MODE, 600 dpi) covered by this test case.

Another evaluation function is our balanced greedy algorithm. For pair-wise coverage the balanced greedy algorithm uses a steepest descent for a potential function on the space of graphs. Consider a graph with a vertex at (f,1) where f is a field and 1 a value. The graph has an edge between (f,1) and (f',1') if the pair (f,1), (f',1') isn't covered. Then each vertex (f,1) is assigned a tuple $(n_1, \ldots, n_v)$ where v is the number of fields and $n_i$ is the number of uncovered pairs {(f,1), (i,1')} for all possible choices. The potential function is the sum of squares of the entries in the tuple.

Another aspect of our random method is that it also incorporates cyclical block methods for generating a block of test cases. A cyclic block of test cases (mod 1) headed by a test case $(a_1, \ldots, a_f)$ is the set of test cases $(a_1+i, \ldots, a_f+i)$ mod 1., for $1 \leqq i \leqq 1$, (for an arbitrary group G a G-block in the set of test cases $(a_1 g, \ldots, a_f g)$ for g in G). In this block mode, a randomly generated test case is used as the header case and then a block of test cases is generated using the cyclical methods. When operating in the block mode, our process would use the cyclical procedures a limited number of times depending on the number of fields. The limit would by a user definable system parameter. If a set of test cases has a block structure, then an additional filed may be added without increasing the number of test cases. The additional field would be assigned a different value for each block of test cases, similar to the "line at infinity" shown in table 50.

The user then can also specify constraints which are used by our method as unallowed test cases. A set of unallowed test cases can be specified using wild cards, *, or explicit values. Other constraints remove test cases from valid relations. For example, if a user specifies a test case that should not happen, that test case is removed from the test set.

Once the appropriate number of test cases for the specified interactions for each relation is generated, our inventive method requires a user to identify fields that are non-interacting; i.e. fields not involved in any cross-validation rule. As an example, Table 63 shown in FIG. 6 depicts two fields that are not interacting. WC stands for a wire center with value WC38 and Head can have two values TOTAL1 and TOTAL2.

AN EXAMPLE APPLICATION OF THE TEST CASE GENERATION PROCEDURES

Consider a relation 81 depicted in FIG. 8 having fifteen fields with some of the fields having three field values 82 and some of the fields have 2 field values 83. Our process 14 determines the number of fields with the most number of field values. In this example, there are 10 fields with three field values. Because the fields have three field values and the number three is a prime number, our process 14 looks to apply projective plane procedures to generate a table of test cases for the ten fields 82. Our process 14 generates test cases using the projective plane procedures for four fields with three values which results in the table of test cases as depicted in table 50 in FIG. 5. The process then applies our product rules to the table of test cases 50. Our process recognizes that applying the reduced product rule covers thirteen fields; whereas in this example it is only necessary to cover ten fields. However, process 14 uses the extra three fields to enumerate three of the fields having two field values 86. The entries into the table are evaluated according to the function MOD[2] and changed. This is depicted in the three columns 86 shown in FIG. 8. If you compare these three columns 86 to the three columns the table of test cases 56 in table 51, this change in readily apparent. Table 81 is then used to seed the random algorithm, which then completes the table by filling in the remaining two columns 87.

TEST CASE MERGING PROCEDURES

Another aspect of our inventive method is the process by which our inventive test script merging process 20 operates on all the tables generated by process 14. Using the relations defined above, our test case merging process 20 would combine the individual table of test case generated for each relation in accordance with the rules that follow:

1. If two or more relations have fields in common, the combined test set for them is the union of the test sets generated for the individual relations; and
2. For those relations that do not have fields in common, the combined test set is created by folding the smaller test set into the larger.

Applying these rules to the test cased generated for relations 1 (table 61), 2 (table 62) and 3 (table 63) which are shown in FIG. 6 works as follows. Relation 1 and relation 2 have fields in common and therefore are combined to produce the union of test cases shown in table 71 shown in FIG. 7. Using our second rule for combining relation 3 63 with the test cases 71 produces a consolidated table of test eight test cases 72.

ADDITIONAL CAPABILITIES

Our invention also provides the user the capability to test the reaction of the system under test to invalid inputs by specifying one or more invalid values for a field that occurs in a relation. It is important to remember that the value is only invalid in the context of a relation and may be valid elsewhere. In the screen testing application, a test case containing an invalid value should produce the appropriate error message. Our system only designates one invalid value per test case to insure that the cause of the error message is identifiable. A system's reaction to n-way faults can be tested by making each faulty entry/input a valid value in an n-way relation. System reactions to multiple faults can be tested by using relations with n-way interactions, with n being the number of faults.

The user can also specify seed test cases for each relation. Seeded test cases can be either required or unallowable. Required seed cases will be guaranteed to be in the final set, while unallowable test cases are guaranteed not to appear in the final test set. Unallowed seed test cases are treated as constraints, while the required seed test cases are used to seed the random greedy algorithm. Since some of the interactions are already covered in the seed required cases, the system produces fewer additional test cases.

The user can also define other constraints that are either required combinations or unallowed combinations where the relationship between the fields are unique combinations of fields or a unique order of values (e.g. increasing or decreasing) among fields. These constraints are used by our system and method to seed the random algorithms.

Another aspect of our inventive method is to define a group of fields as a virtual field (hereinafter called compounds) and use these compounds with other fields in defining a relation to be processed by our method. In processing, a compound is treated like a singular field. These relations including compounds would be stored in database 18 and used by the system as a singular field to be built into relations and treated as a single field for our inventive process.

Another aspect of our system is its application in screen based software systems to define relations as requirements for the software development. These relations can then by saved and used to test the resulting developed software to assure that the system operates in accordance with the defined requirements.

Finally, although the system and method described herein is described in terms of its application to software, our invention is easily applicable to any system or process (i.e. manufacturing, hardware interaction, etc.) where there are multiple components or elements that must interact and it is impossible to test all interactions. Each of the components are analogous to the fields described above and each of the components has characteristics or features that are analogous to our field values. Our system and method can be used to generate tables test cases enumerating combinations of those components that interact. It therefore understood that the system and method for providing automated test case generation is not limited to the specific forms disclosed and illustrated, but may assume other embodiments limited only by the scope of the appended claims.

We claim:

1. A method for generating a minimal plurality of test cases for testing software systems with the software having a plurality of data fields with multiple possible values, said method comprising the steps of:

inputting into a database all fields and field values;

defining a plurality of tables containing related field values;

generating a table of test cases for each of said tables of field values using a user specified value for degree of interaction between fields; and merging said tables of test cases into a single table of test cases.

2. The method according to claim 1 wherein said step of merging said tables of test cases comprises;

creating a union of said tables if two or more of said tables containing related fields have fields in common; and folding a smaller table of test cases into a larger table of test cases whenever any two of said tables do not have any fields in common.

3. The method according to claim 2 wherein said step of generating a table of test cases comprises:

using a deterministic algorithm to attempt to generate said table; and using a random algorithm for generating said table if said deterministic algorithm cannot be used to generate a table of test cases.

4. The method according to claim 3 wherein said deterministic algorithm is a projective plane algorithm whenever the number of field values for fields having the largest number of values is a prime power and said number of fields is less than one more than said prime power.

5. The method according to claim 4 wherein said deterministic algorithm further includes a product rule algorithm.

6. The method according to claim 5 wherein said random algorithm comprises:

selecting at random a test case composed of a subset of cases with a number of fields less than the total number of fields in a table and which meets the criteria of having a largest number of uncovered combinations;

selecting in a random order the remaining fields that were not included in the fields that are used in said subset;

for each of said remaining fields selected, find field values that results in a highest score when evaluated using an evaluation function; and checking that the generated test case meets all user defined constraints.

7. The method according to claim 6 wherein said evaluation function locally optimizes the number of new n-set covered combinations.

8. The method according to claim 6 wherein said evaluation function is one that uses the steepest decent function on a plane of graphs.

9. The method of claim 1 whereby the step of defining a plurality of tables is created by capturing screens generated by the users.

10. A system for automatically generating a minimum plurality of test cases for testing software systems; said system comprising:

a display terminal having screen displays whereby a user can input values for fields on said screen and define a plurality of relations among the fields;

a database for storing said plurality of relations;

a first computer means for generating a set of test cases for each of said relations based on a user specified value for identifying a number of interacting fields within said relations;

a second computer means for combining said test cases for each of said plurality of relations having interacting values with said relations having non-interacting values and providing a merged table of test cases; and output means for writing to a database said merged table of test cases.

11. The system of claim 10 further comprising a test script generation means which accepts said merged table of test cases from said output means to generate a test script capable of being executed to automatically test software.

12. The system of claim 11 wherein said system further comprises a capture means to capture user activities on a screen and create a database of relations.

13. The system of claim 11 wherein said first computer means for generating a set of test cases is comprised of:

a deterministic means for generating tables of test cases from relations; and a random means for generating tables of test cases from relations when said deterministic means is inapplicable.

14. A method for automatically generating a table of test cases for testing software systems which consists of and operate on data elements and values for data elements, said method executed by a computer comprising the steps of:

identifying relationships between data elements;

determining a table of test cases for each of said data elements based on said identified relationships between said data elements with said identified relationships based on user specified n-tuple combinations between values of said relationships, said method of determining comprising the steps of:

using deterministic procedures for determining said table of test cases; and using random procedures for determining said table of test cases whenever said deterministic procedures cannot be used to generate said table; and merging said tables of test cases into a single table of generated test cases by creating a union of the table of test cases whenever said tables have two or more data elements in common and if test cases do not have fields in common a smaller table is folded into a larger table.

15. The method according to claim 14 wherein said deterministic procedures incorporate a projective plain algorithm.

16. The method according to claim 15 wherein said random procedures further comprises the steps of:

selecting at random a test case composed of a subset of cases with a number of data elements less than the total number of data elements in a table and which meets the criteria of having a largest number of uncovered combinations;

selecting in a random order the remaining data elements that were not included in the data elements that are used in said subset;

for each of said remaining data elements selected, find data element values that result in a high score when evaluated using an evaluation function;

selecting as a generated test case to be included in said table of generated test cases said test case with data element values having a high score; and checking that said generated test case meets all user defined constraints.

17. The method according to claim 16 wherein said evaluation function determines a local optimal value.

18. The method according to claim 16 wherein said evaluation function determines the value based on the steepest descent for a potential function of a space of graphs.

19. A method for automatically generating a table of test cases for testing combinations of components of a process or components of a system that interact, with each of said components having a plurality of characteristics, said method executed by a computer comprising the steps of:

identifying relationships between components by specifying n-tuple combinations of said components;

determining a table of test cases of characteristic values for each of said identified relationships between components by using deterministic procedures for determining said table of test cases; and using random procedures for determining said table of test cases whenever said deterministic procedures cannot be used to generate said table; and merging said tables of test cases into a single table of generated test cases by creating a union of the table of test cases whenever said tables have two or more components in common and if test cases do not have components in common a smaller table is folded into a larger table.

20. The method according to claim 19 wherein said deterministic procedures incorporate a projective plain algorithm.

21. The method according to claim 20 wherein said random procedures further comprises the steps of:

selecting at random a test case composed of a subset of cases with a number of components less than the total number of components in a table and which meets the criteria of having a largest number of uncovered combinations;

selecting in a random order the remaining components that were not included in the data elements that are used in said subset;

for each of said remaining components selected, find characteristic for that component that result in a high score when evaluated using an evaluation function;

selecting as a generated test case to be included in said table of generated test cases said test case with component values having a high score; and checking that said generated test case meets all user defined constraints.

22. The method according to claim 21 wherein said evaluation function determines a local optimal value.

23. The method according to claim 21 wherein said evaluation function determines the value based on the steepest descent for a potential function of a space of graphs.

* * * * *